United States Patent

Ohki et al.

[11] Patent Number: 5,827,160
[45] Date of Patent: Oct. 27, 1998

[54] SEMICONDUCTIVE SILICONE RUBBER ROLLER THEREOF

[75] Inventors: Tsuneo Ohki; Shuji Oguchi; Masahiro Ikeda, all of Saitama-ken, Japan

[73] Assignee: Shin-Etsu Polymer Co., Ltd., Tokyo, Japan

[21] Appl. No.: 818,017

[22] Filed: Mar. 14, 1997

[30] Foreign Application Priority Data

Mar. 19, 1996  [JP]  Japan .................................. 8-062334

[51] Int. Cl.⁶ .................................................. B23P 15/00
[52] U.S. Cl. ................................................. 492/56; 492/59
[58] Field of Search .................. 492/56, 25, 59; 399/333

[56] References Cited

U.S. PATENT DOCUMENTS 5,065,193  11/1991  Saitoh et al. .............................. 29/895
5,625,858   4/1997  Hirai et al. ................................ 492/56
5,717,988   2/1998  Jinzai et al. ............................. 399/333
5,729,813   3/1998  Eddy et al. ............................... 492/56
5,733,235   3/1998  Waku et al. ............................... 492/56
5,740,513   4/1998  Matsuo et al. .......................... 399/333

*Primary Examiner*—Irene Cuda
*Attorney, Agent, or Firm*—David E. Dougherty, Esq.

[57] ABSTRACT

Disclosed is an improvement in a rubber roller as a developing roller in a electrophotographic printer of which the silicone rubber forming the rubber layer on and around a metallic core mandrel is electrically semiconductive. The printing characteristics and abrasion resistance of the rubber roller to ensure good durability of the rubber roller in printing services can be greatly improved by the irradiation treatment of the rubber surface with ultraviolet light having principal wavelengths of 253.7 nm and 184.9 nm in an irradiation dose of 1.2 to 76 $J/cm^2$, preferably, in an oxygen-containing atmosphere to form an ultraviolet-hardened surface layer of which the rubber surface has a specified surface rough-ness.

1 Claim, 1 Drawing Sheet

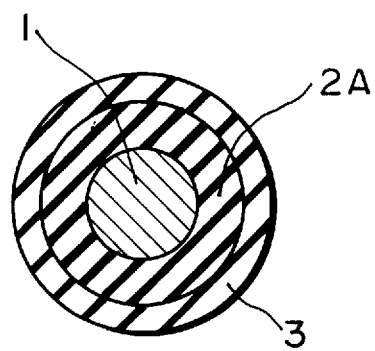
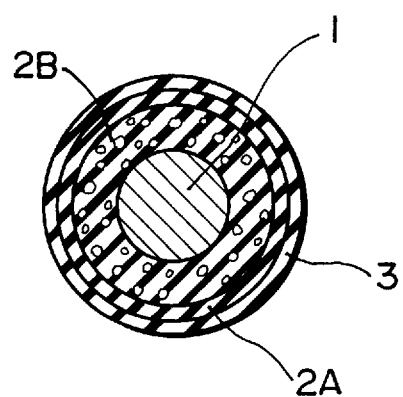
FIG. 1A     FIG. 1B
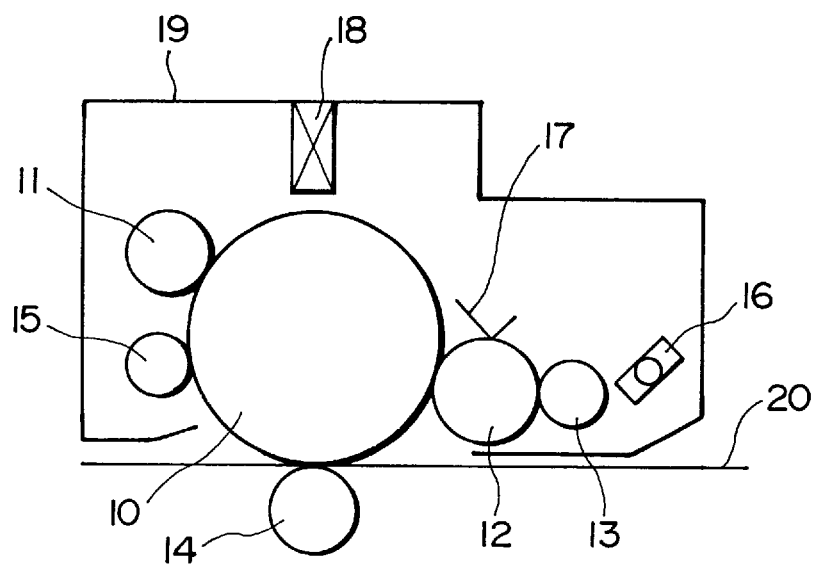
FIG. 2

SEMICONDUCTIVE SILICONE RUBBER ROLLER THEREOF

BACKGROUND OF THE INVENTION

The present invention relates to a novel semiconductive silicone rubber roller and a method for the preparation thereof. More particularly, the invention relates to a rubber roller consisting of an electroconductive core mandrel and a layer of a silicone rubber on and around the core mandrel, of which the silicone rubber has an electric resistivity in the semiconductor range, useful as a developer roller in photocopying machines, laser beam printers in computers and facsimile machines and the like and capable of exhibiting excellent durability in the printing characteristics as well as a unique method for the preparation of such a silicone rubber roller.

A rubber roller consisting of a electrically conductive or metallic core mandrel and a semiconductive rubber layer on and around the core mandrel is widely used as a developer roller in various kinds of electrophotographic printers. FIG. 2 of the accompanying drawing schematically illustrates an example of such an electrophotographic printer system in which frictionally electrified toner particles are held on the surface of the rubber roller in a very thin layer so as to visualize the latent image formed on a latent image-bearing body.

The developing system of an electrophotographic printer schematically illustrated in FIG. 2 consists of a light-sensitive drum 10, electrification roller 11, developing roller 12, toner-carrying roller 13, transfer roller 14, cleaning roller 15, stirrer 16, frictional electrification blade 17, LED array 18 and casing 19 and a sheet of recording chart paper 20 is driven between the light-sensitive roller 10 and the transfer roller 14.

In the above illustrated developing system, a rubber roller of which the rubber layer is semiconductive is used. Such a semiconductive rubbery material is prepared, for example, by compounding a base rubber such as urethane rubbers, NBRs, silicone rubbers and the like with an ionically electroconductive agent or an electron-conductive filler to impart electroconductivity to the base rubber.

In the compounding formulation of the above mentioned semiconductive rubbery material for semiconductive rubber rollers based on a urethane rubber, NBR and the like, it is usual that the rubber composition is compounded with liquid additives such as process oils, softening agents and the like with an object to have an adequately decreased hardness of the rubber. Since such a liquid additive is subject to bleeding on the surface of the rubber roller to cause serious troubles, it is usual that the rubber roller is provided on the surface with a bleeding-preventing protective layer of a resin such as urethane resins, nylons and the like. The resinous protective layer on the rubber surface, however, causes another trouble because the weatherability of the resinous material is not so high and the resin is susceptible to hydrolysis when prolongedly exposed to an adverse ambience of high temperature and high humidity to cause adhesion of the denaturated resinous material to the surface of the latent-image carrier. When such a surface-protected rubber roller is used as a developing roller in certain types of electrophotographic printers, the cleaning effect for the toner particles is not always high enough presumably due to the insufficient adhesion of the toner particles to the protected roller surface.

As a countermeasure for the above mentioned problems, a proposal has been made for the use of a silicone rubber as the rubbery material in semiconductive rubber rollers for printers by utilizing the very excellent weatherability to exhibit high cleaning effect for toner particles although silicone rubber-made semiconductive developing rollers have another problem that the printing characteristics of the rubber roller are subject to degradation when the roller is used over a long time due to the relatively low abrasion resistance of silicone rubbers in general resulting in abrasive wearing of the rubber surface.

SUMMARY OF THE INVENTION

The present invention accordingly has an object to provide a semiconductive rubber roller for electrophotographic printers capable of exhibiting long-term stability of the printing characteristics as well as a method for the preparation thereof.

Thus, the present invention provides an improvement, in a rubber roller consisting of a core mandrel of a rigid electroconductive material such as metals and a tubular layer of a cured silicone rubber on and around the core mandrel, the silicone rubber having a volume resistivity in the range from $1 \times 10^4$ to $1 \times 10^9$ ohm.cm, which improvement comprises having the outer surface of the silicone rubber layer subjected to irradiation with ultraviolet light having principal wavelengths of 253.7 nm and 184.9 nm in an ultraviolet irradiation dose in the range from 1.2 to 76 $J/cm^2$ relative to the energy of the ultraviolet light of 253.7 nm wavelength to form an ultraviolet-hardened surface layer having such a surface roughness with an irregularity amplitude Rz of at least 8 $\mu$m and an average irregularity distance Sm not exceeding 50 $\mu$m.

The method for the preparation of the above defined improved silicone rubber roller comprises the steps of:

(a) forming, on and around a core mandrel of a rigid electroconductive material, a tubular layer of a cured silicone rubber, the silicone rubber having a volume resistivity in the range from $1 \times 10^4$ to $1 \times 10^9$ ohm.cm; and (b) irradiating the outer surface of the silicone rubber layer with ultraviolet light having principal wavelengths of 253.7 nm and 184.9 nm in an ultraviolet irradiation dose in the range from 1.2 to 76 $J/cm^2$ relative to the energy of the ultraviolet light of 253.7 nm wavelength.

BRIEF DESCRIPTION OF THE DRAWING

FIGS. 1A and 1B are each a schematic radial cross sectional view of the inventive silicone rubber roller without or with an underlayer of a spongy silicone rubber, respectively.

FIG. 2 is a schematic illustration of an electrophotographic printer system used for the tests in the Examples and Comparative Examples.

DETAILED DESCRIPTION OF THE PREFERRED EMBODIMENTS

As is understood from the above described summary, the most characteristic feature of the present invention consists in the irradiation treatment of the outer surface of the silicone rubber layer of a silicone rubber roller with ultraviolet light of specified principal wavelengths in such an energy dose that the ultraviolet-hardened surface layer may have a specified surface roughness.

In the following, the semiconductive silicone rubber roller improved according to the invention is illustrated in detail by making reference to FIGS. 1A and 1B of the accompanying drawing.

FIG. 1A illustrates a schematic radial cross sectional view of the inventive silicone rubber roller according to a first embodiment, which consists of an electroconductive core mandrel 1 of, usu-ally, a metal and a tubular silicone rubber layer 2A on and around the core mandrel 1. The silicone rubber forming the layer 2A is solid, i.e. not spongy, and the outer surface of the silicone rubber layer 2 is hardened by the irradiation with ultraviolet light to form an ultraviolet-hardened surface layer 3.

FIG. 1B illustrates a radial cross sectional view of the inventive silicone rubber roller according to a second embodiment, in which the solid or non-spongy silicone rubber layer 2A is formed on and around an underlayer 2B of a spongy silicone rubber.

The semiconductive silicone rubber roller of the invention can be used in the printer system illustrated in FIG. 2 by grounding the electroconductive core mandrel 1 or by applying a bias voltage thereto to work for injection of charges to the toner particles and to develop the electrostatic latent images by the transfer of the toner particles.

The material of the electroconductive core mandrel 1 is not particularly limitative including metals, resins and ceramics provided that at least the surface layer thereof has an electroconductivity in the metallic conductivity range. Accordingly, the material of the core mandrel 1 is not limited to metals such as aluminum, stainless steel, brass and the like but can be a thermoplastic or thermosetting resin if the surface of the resin mandrel is rendered electroconductive by forming a metallic plating layer or can be an electroconductive resinous composition consisting of a resin and a sufficient amount of an electroconductive filler such as carbon blacks and metal powders.

The semiconductive silicone rubber forming the semiconductive rubber layer 2A is a cured body of a silicone rubber compound comprising, as a uniform blend, an organopolysiloxane gum, such as dimethylpolysiloxanes, methylvinylpolysiloxanes, methylphenylpolysiloxanes and the like having a gummy consistency either alone or in combination, and a reinforcing filler such as fumed silica and precipitated silica fillers with further admixture of a suitable amount of an conductivity-imparting agent exemplified by an electroconductive carbon black, powder of a metal such as nickel, aluminum, copper and the like, powder of a metal oxide having electroconductivity such as zinc oxide, tin oxide and the like or powder of insulating inorganic compound such as barium sulfate, titanium dioxide, potassium titanate and the like, of which the particles are provided with a conductive coating layer of, for example, tin oxide as well as a curing agent which may be an organic peroxide or, when the organopolysiloxane gum has vinyl groups, a combination of an organohydrogenpolysiloxane and a catalytic platinum compound. The silicone rubber compound thus obtained is shaped and cured on and around the core mandrel 1 to form a tubular semiconductive non-spongy silicone rubber layer 2A by the method of compression molding, extrusion molding, injection molding and the like under suitable conditions for curing.

As is illustrated in FIG. 1B for a second embodiment of the invention, it is optional that the above mentioned non-spongy semiconductive silicone rubber layer 2A is formed on an underlayer 2B of a spongy silicone rubber formed on and around the core mandrel 1, for which the silicone rubber compound is further admixed with a suitable amount of a blowing agent such as azobisisobutyronitrile, azodicarbonamide and the like to effect foaming of the silicone rubber concurrently with curing by heating.

Though dependent on the particularly intended application of the rubber roller, the semiconductive silicone rubber layer 2A on and around the core mandrel 1 should have a volume resistivity in the range from $1\times10^1$ to $1\times10^9$ ohm.cm or, preferably, in the range from $1\times10^4$ to $1\times10^9$ ohm.cm. When the volume resistivity of the semiconductive silicone rubber layer 2A is too low or too high, troubles are sometimes encountered in the printing procedure such as scattering of toner particles beyond the imaging areas, occurrence of so-called fogging. disordered printing density and so on.

The semiconductive silicone rubber layer 2A serves in the printing process as an electrode for development, contact-electrification electrode for toner particles and electrode for charge injection and serves to carry and transfer the toner particles on the surface of the roller by means of the surface irregularities and an attractive force such as a van der Waals force, image force, Coulomb force and the like. Since the rubbery material is a silicone rubber, the semiconductive rubber layer 2A exhibits excellent weatherability against adverse conditions of high temperature and high humidity and, when an electronic conductivity-imparting agent is used, the electroconductivity of the rubber layer 2A little depends on the ambient conditions.

Applicable methods to the formation of the semiconductive silicone rubber layer 2A on and around the core mandrel 1 include the extrusion molding method in which a silicone rubber compound is sheeted integrally with the core mandrel by using an extruder machine equipped with a crosshead followed by primary curing of the silicone rubber layer in a Geer oven or an infrared oven, injection molding method in which the silicone rubber compound is injected into the cavity of a metal mold holding the core mandrel therein to effect primary curing of the silicone rubber compound at room temperature or at an elevated temperature, compression molding method in which the silicone rubber compound is compression-molded under heating in a metal mold holding the core mandrel and so on, though not particularly limitative thereto. The silicone rubber layer after the primary curing in the above described manner is then subjected to a secondary curing treatment for a specified length of time in a Geer oven and the like so as to be imparted with stabilized physical properties.

The above obtained integral body consisting of the core mandrel and the silicone rubber layer thereon is a precursor of the inventive semiconductive silicone rubber roller. Namely the precursor body is irradiated with ultraviolet light, usually, after finishing of the outer circumference, for example, on a cylindrical grinding machine to have a specified uniform outer diameter. If desired, the ultraviolet irradiation treatment can be performed after modification of the surface condition of the silicone rubber layer by shotblasting, sandblasting, lapping, buffing and the like.

The silicone rubber roller after the mechanical finishing in the above described manner is then irradiated with ultraviolet light having principal wavelengths of 253.7 nm and 184.9 nm in an integral dose in the range from 1.2 to 76 $J/cm^2$, preferably, in an oxygen-containing atmosphere to form an ultraviolet-hardened layer 3 as a surface layer of the semiconductive silicone rubber layer 2A.

The ultraviolet light here implied is a light having a wavelength in the range from 100 to 380 nm in a broader definition or from 200 to 280 nm in a narrower definition. While it is well known in the art that a cleaning effect can be obtained by the ultraviolet irradiation on a substrate body of glass, metal, ceramic and the like stained with a greasy or oily contaminant, the very discovery leading to the present invention is that an ultraviolet-hardened surface layer 3 can be formed on the semiconductive silicone rubber layer 2A without substantial degradation thereof when the ultraviolet irradiation is performed under the above mentioned conditions, preferably, in an oxygen-containing atmosphere such as air, optionally, enriched or lean relative to the content of oxygen.

Although it is optional according to need that the ultraviolet irradiation is performed stepwise first with the light of 184.9 nm wavelength and then with the light of 253.7 nm wavelength or vice versa, a most convenient and preferable way is to conduct the ultraviolet irradiation by using a light source emitting the ultraviolet light in both of these two wavelengths from the standpoint to accomplish high productivity and to avoid possible problems against the working environment. The reason for this preference is as follows.

When the ultraviolet irradiation is performed in an oxygen-containing atmosphere such as oxygen, air or an oxygen-enriched or oxygen-depleted air with an ultraviolet light source emitting in the wavelength of 184.9 nm, the light of this wavelength is absorbed by the oxygen in the atmosphere to generate ozone $O_3$ according to the reaction equations of: $O_2 \rightarrow O+O$ and $O+O_2 \rightarrow O_3$. In contrast thereto, the ultraviolet light of 253.7 nm wavelength acts to decompose ozone $O_3$ when absorbed thereby. As is generally recognized, ozone is a very strong oxidant so that a large amount of ozone taken into a human body may cause serious damages on the human health. When the ultraviolet irradiation is performed with both of the ultraviolet lights of the above mentioned two wavelengths either simultaneously or successively, the irradiation with the 184.9 nm light being immediately followed by the irradiation with the 253.7 nm light, the ozone generated by the former light is decomposed by the latter light so that the ozone concentration in the atmosphere of the working environment can be suppressed below a tolerable upper limit to ensure workers' health.

Though with a problem of safety as mentioned above, the ozone generated by the ultraviolet irradiation as a very strong oxidant is presumably effective on the modification of the surface properties of the semiconductive silicone rubber layer 2A. Namely, the chemical effect thereby is a decrease in the content of carbon and an increase in the content of oxygen in the surface layer 3 while the physical effect thereby is formation of very fine irregularities or surface ruggedness with a decrease in the static friction coefficient. It is further presumable that three-dimensional crosslinks are formed between the organopolysiloxane molecules contributing to the improvement of the abrasion resistance of the rubber surface as a synergistic effect with the decrease in the friction coefficient.

The light source for the ultraviolet irradiation is not particularly limitative but low-pressure mercury lamps commercially available on the market can be used satisfactorily because the energy distribution of the ultraviolet light emitted therefrom is such that about 90% of the ultraviolet energy is occupied by the light of 253.7 nm wavelength with a few % energy contribution by the light of 184.9 nm wavelength.

The ultraviolet irradiation of the semiconductive silicone rubber surface with the ultraviolet light comprising the two principal wavelengths is performed preferably in an integral irradiation dose in the range from 1.2 to 76 J/cm². When the irradiation dose is too small, the desired beneficial effect on the surface properties of the silicone rubber layer cannot be accomplished as a matter of course. When the ultraviolet irradiation dose is too large, on the other hand, degradation is caused in the properties of the semiconductive silicone rubber layer so that the rubber roller cannot be used in a long-term use to cause deterioration in the printing characteristics.

The ultraviolet irradiation treatment can be performed either as a batch process or as a continuous process utilizing a conveyor system provided uniformity in the irradiation dose can be ensured on allover the surface of the silicone rubber layer. In this regard, it is preferable that the ultraviolet irradiation apparatus has a mechanism for axial revolving of the rubber roller under treatment or for traveling of the ultraviolet lamps at a constant velocity along the surface of the rubber roller in order to avoid local or uneven irradiation.

As is mentioned above, the improvement in the abrasion resistance of the silicone rubber surface by the ultraviolet irradiation treatment is partly due to the appearance of fine and high-density surface irregularities, which can be measured by using a surface roughness tester. For example, the 10 point-average roughness was increased by 1.04 to 2.02 times by the ultraviolet irradiation and the average spatial frequency as a measure of the irregularity density was increased from 12.5 $mm^{-1}$ before the ultraviolet irradiation to 20 to 55 $mm^{-1}$ after the irradiation.

The above mentioned parameters representing the surface roughness were obtained by using a combination of a surface roughness tester (Model Surfcom 554A, manufactured by Tokyo Seimitsu Co.) and a circumferential roughness driving unit (Model E-RM-S07A, manufactured by the same company above) equipped with a pickup having a probe of 10 μm diameter under a probe load of 0.07 mN. This surface roughness testing instrument was run under the conditions of: 0.32 mm of cutoff, 0.3 mm/second of traveling velocity and 0.50 mm of traveling span at a temperature of 20° C. The chart recording was made with magnifications of 2000 times and 50 times in the direction of depth and in the circumferential direction of the roller, respectively. The 10 point-average roughness was calculated by the built-in computing unit of the instrument and the average spatial frequency was calculated by counting the wavy irregularities on the recording chart. As is taught in Japanese Patent Kokai 6-41437, surface irregularities with protrusions and cavities have an effect to stabilize the printing characteristics of the silicone rubber roller as a developing roller in electrophotographic printers because the toner particles are retained on the roller surface by hanging to the irregularities so that the carried amount of the toner particles is little changed even after long-time running of the printer roller.

In the following, the present invention is illustrated in more detail by way of Examples and Comparative Examples although the scope of the invention is never limited thereby in any way.

EXAMPLE 1

A rod of free-cutting steel of the SUM 22 grade having a diameter of 10 mm and a length of 250 mm was coated with a silicone primer (Primer No. 16, a product by Shin-Etsu Chemical Co.) and subjected to a baking treatment in a Geer oven at 150° C. for 10 minutes.

Separately, a semiconductive silicone rubber compound was prepared by uniformly blending 100 parts by weight of a silicone rubber gum curable with an organic peroxide (KE 78VES, a product by Shin-Etsu Chemical Co.) with 10 parts by weight of a carbon black (thermal black, Asahithermal, a product by Asahi Carbon Co.) and 25 parts by weight of a fumed silica filler (Aerosil 200, a product by Nippon Aerosil Co.) in a pressurizable kneader followed by further admixture of 2.0 parts by weight of an organic peroxide-based curing agent (C-8, a product by Shin-Etsu Chemical Co.).

The thus prepared silicone rubber compound was introduced into the cylindrical cavity of 20 mm diameter in a metal mold for compression molding together with the primer-treated steel rod as the core mandrel and cured thereon and adhesively bonded thereto by heating at 175° C. for 10 minutes under compression followed by secondary curing in a Geer oven at 200° C. for 7 hours to form a curved tubular solid silicone rubber layer on and around the core mandrel. The outer surface of the silicone rubber layer was ground on a cylindrical grinding machine to finish a silicone rubber roller of which the silicone rubber layer had an outer diameter of 18 mm and a length of 210 mm. The silicone rubber layer had a surface roughness Rz of 8.5 µm.

In the next place, the surface of the silicone rubber layer was irradiated with ultraviolet light emitted from a 80-watts low-pressure mercury lamp of a linear output density of 1 watt/cm at a distance of 20 mm while the silicone rubber roller was rotated around the core mandrel as the axis for 1 minute to give an ultraviolet irradiation dose of 1.3 J/cm$^2$. The silicone rubber roller thus obtained was subjected to the evaluation tests for the surface roughness, roller resistance and average spatial frequency of the surface irregularities by the respective testing procedures described below to give the results shown in Table 1 to follow under the headings of SR, RR and ASF, respectively.

Surface roughness (SR):

Measurement of the surface roughness or irregularity amplitude Rz was made by using a universal surface roughness tester for the 10 point-average roughness in µm in the circumferential direction of the roller.

Roller resistance (RR):

The silicone rubber roller after the ultraviolet irradiation treatment was horizontally laid on a 205 mm-long elongated gold-plated electrode and the silicone rubber layer was pressed down against the electrode by hanging a 500 g weight on each of the end portions of the core mandrel. The electric resistance in kohm was measured between the core mandrel and the electrode by applying a DC voltage of 10 volts therebetween.

Average spatial frequency of surface irregularities (ASF):

The number of the peak heads and local peak heads was counted on the recording chart of the surface roughness measurement in the circumferential direction of the rubber roller and the average number thereof per mm, which is the reciprocal of the average irregularity distance Sm, was recorded.

Further, the silicone rubber roller was subjected to a durability test in a continued running as a developing roller in an electrophotographic printer by 5000 times repetition of solid black printing, halftone dots printing, 5%-duty printing and white-background printing and measurements were made before and after the running test for the following items including weight decrease of the rubber roller, fogging and printing density by the respective procedures described there to give the results shown in Table 1 under the headings of WD, FG and PD, respectively. In this running test, adhesion of the toner particles to the roller surface was not found. Blur of the printed image was not found even after the running test. As a general evaluation, the silicone rubber roller was found acceptable.

Weight decrease of rubber roller (WD):

The weight of the rubber roller was exactly measured by using a precision balance and the difference in weight in mg was recorded before and after the running test as a measure of the abrasion resistance.

Fogging (FG):

Measurements were made for the Macbeth density on the white background in the above mentioned 5%-duty printing by using a Macbeth densitometer. A fogging value not exceeding 0.015 is required for an acceptable rubber roller both before and after the running test.

Printing density (PD):

Measurements of the Macbeth density were made for the density in the solid black-printing by using a Macbeth densitometer. A printing density value of at least 1.3 is required for an acceptable rubber roller both before and after the running test.

EXAMPLES 2 TO 4

The procedures for the preparation of the silicone rubber rollers and the evaluation tests thereof were substantially the same as in Example 1 described above excepting for the increase in the time length of the ultraviolet irradiation treatment from 1 minutes in Example 1 to 10 minutes, 30 minutes and 60 minutes to give ultraviolet irradiation doses of 12.6 J/cm$^2$, 37.8 J/cm$^2$ and 75.6 J/cm$^2$, respectively. The results of the evaluation tests are shown in Table 1. Adhesion of the toner particles to the roller surface was not found in none of these Examples. Blur of the printed images was found in none of these Examples even after the running test. Each of the silicone rubber rollers in these Examples was rated as acceptable.

COMPARATIVE EXAMPLES 1 TO 3

The procedures for the preparation of the silicone rubber rollers and the evaluation tests thereof were substantially the same as in Example 1 described above excepting for the omission of the ultraviolet irradiation treatment in Comparative Example 1 and decrease and increase in the time length of the ultraviolet irradiation treatment from 1 minute in Example 1 to 0.5 minute and 70 minutes to give ultraviolet irradiation doses of 0.6 J/cm$^2$ and 88.2 J/cm$^2$ in Comparative Examples 2 and 3, respectively. The results of the evaluation tests are shown in Table 1. Blur of the printed images was found in Comparative Example 1 after the running test but not in Comparative Examples 2 and 3. Although adhesion of the toner particles to the roller surface was not found in each of these Comparative Examples, each of the silicone rubber rollers in these Comparative Examples was rated as unacceptable.

TABLE 1

| Item | Example | | | | Comparative Example | | |
|---|---|---|---|---|---|---|---|
| | 1 | 2 | 3 | 4 | 1 | 2 | 3 |
| SR, µm | 8.64 | 10.69 | 15.18 | 16.79 | 8.33 | 8.48 | 16.52 |
| RR, kohm | 122 | 352 | 1120 | 1570 | 20.6 | 56 | 1640 |
| ASF, mm$^{-1}$ | 23.3 | 25.6 | 30.6 | 55.1 | 12.5 | 15.4 | 58.7 |
| WD, mg | 28 | 20 | 15 | 27 | 43 | 36 | 34 |
| FG | | | | | | | |
| initial | 0.011 | 0.011 | 0.010 | 0.012 | 0.012 | 0.011 | 0.012 |
| as runned | 0.014 | 0.012 | 0.012 | 0.014 | 0.014 | 0.014 | 0.012 |
| PD | | | | | | | |
| initial | 1.41 | 1.40 | 1.43 | 1.44 | 1.32 | 1.40 | 1.43 |
| as runned | 1.32 | 1.38 | 1.41 | 1.31 | 1.01 | 1.18 | 1.28 |

COMPARATIVE EXAMPLES 4 TO 8

The procedures for the preparation of the silicone rubber rollers and the evaluation tests thereof were substantially the same as in Example 1 described above except that the ultraviolet irradiation treatment of the silicone rubber surface was performed with, in place of the low-pressure mercury lamp, a high-pressure mercury lamp emitting ultraviolet light having wavelengths of 365 nm, 546.1 nm, 577 nm and 435.8 nm to give ultraviolet irradiation doses of 0.5 J/cm$^2$, 1.3 J/cm$^2$, 30.3 J/cm$^2$, 75.2 J/cm$^2$ and 90.4 J/cm$^2$ in Comparative Examples 4, 5, 6, 7 and 8, respectively. The results of the evaluation tests are shown in Table 2. Blur of the printed images was found in each of these Comparative Examples after the running test. Although adhesion of the toner particles to the roller surface was not found in each of these Comparative Examples, the silicone rubber rollers in these Comparative Examples were each rated as unacceptable.

TABLE 2

| Item | Comparative Example | | | | |
|---|---|---|---|---|---|
| | 4 | 5 | 6 | 7 | 8 |
| SR, μm | 8.41 | 8.56 | 8.34 | 7.27 | 6.93 |
| RR, kohm | 85 | 132 | 946 | 1270 | 1650 |
| FG | | | | | |
| initial | 0.011 | 0.011 | 0.011 | 0.011 | 0.011 |
| as runned | 0.014 | 0.013 | 0.015 | 0.014 | 0.014 |
| PD | | | | | |
| initial | 1.41 | 1.41 | 1.40 | 1.40 | 1.41 |
| as runned | 1.06 | 1.12 | 1.15 | 1.16 | 1.18 |

What is claimed is:

1. In a rubber roller consisting of a core mandrel of a rigid electroconductive material and a tubular layer of a cured silicone rubber on and around the core mandrel, of which the silicone rubber has a volume resistivity in the range from $1 \times 10^4$ to $1 \times 10^9$ ohm·cm, the improvement which comprises having the outer surface of the silicone rubber layer subjected to irradiation with ultraviolet light having principal wavelengths of 253.7 nm and 184.9 nm in an ultraviolet irradiation dose in the range from 1.2 to 76 $J/cm^2$ relative to the energy of the ultraviolet light of 253.7 nm wavelength to form an ultraviolet-hardened surface layer having such a surface roughness that the irregularity amplitude Rz is at least 8 μm and the average irregularity distance Sm is not exceeding 50 μm.

* * * * *